(12) United States Patent
Hoover et al.

(10) Patent No.: US 8,195,884 B2
(45) Date of Patent: Jun. 5, 2012

(54) NETWORK ON CHIP WITH CACHING RESTRICTIONS FOR PAGES OF COMPUTER MEMORY

(75) Inventors: Russell D. Hoover, Rochester, MN (US); Eric O. Mejdrich, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 12/233,180

(22) Filed: Sep. 18, 2008

(65) Prior Publication Data
US 2010/0070714 A1    Mar. 18, 2010

(51) Int. Cl.
G06F 12/08    (2006.01)
(52) U.S. Cl. . 711/128; 711/145; 711/137; 711/E12.018; 709/213
(58) Field of Classification Search .......... 711/144, 711/141, 146, 128, 145, E12.001, 133, 137; 709/213
See application file for complete search history.

(56) References Cited

U.S. PATENT DOCUMENTS

| | | | |
|---|---|---|---|
| 4,813,037 A | 3/1989 | Debuysscher et al. | |
| 4,951,195 A | 8/1990 | Fogg et al. | |
| 5,167,023 A | 11/1992 | De Nicolas et al. | |
| 5,301,302 A | 4/1994 | Blackard et al. | |
| 5,442,797 A | 8/1995 | Casavant et al. | |
| 5,590,308 A | 12/1996 | Shih | |
| 5,761,516 A | 6/1998 | Rostoker et al. | |
| 5,784,706 A | 7/1998 | Oberlin et al. | |
| 5,870,479 A | 2/1999 | Feiken et al. | |
| 5,884,060 A | 3/1999 | Vegesna et al. | |
| 5,887,166 A | 3/1999 | Mallick et al. | |
| 5,974,487 A | 10/1999 | Hartmann | |
| 6,021,470 A | 2/2000 | Frank et al. | |
| 6,044,478 A * | 3/2000 | Green | 711/141 |

(Continued)

FOREIGN PATENT DOCUMENTS

CN    1599471    3/2005

OTHER PUBLICATIONS

Nollet, V., et al., "Centralized Run-Time Resource Management in a Network-on-Chip Containing Reconfigurable Hardware Tiles" [online]. 2005 [retrieved Jul. 15, 2011], Retrieved from Internet: http://portal.acm.org/ft_gateway.cfm?id=1049106&type=pdf &CFID=32720390&CFTOKEN=986277114, pp. 1-6.

(Continued)

*Primary Examiner* — Pierre-Michel Bataille
(74) *Attorney, Agent, or Firm* — Biggers & Ohanian LLP (57) ABSTRACT

A network on chip ('NOC') that includes integrated processor ('IP') blocks, routers, memory communications controllers, and network interface controllers, each IP block adapted to a router through a memory communications controller and a network interface controller, a multiplicity of computer processors, each computer processor implementing a plurality of hardware threads of execution; and computer memory, the computer memory organized in pages and operatively coupled to one or more of the computer processors, the computer memory including a set associative cache, the cache comprising cache ways organized in sets, the cache being shared among the hardware threads of execution, each page of computer memory restricted for caching by one replacement vector of a class of replacement vectors to particular ways of the cache, each page of memory further restricted for caching by one or more bits of a replacement vector classification to particular sets of ways of the cache.

18 Claims, 5 Drawing Sheets

U.S. PATENT DOCUMENTS

| | | | |
|---|---|---|---|
| 6,047,122 A | 4/2000 | Spiller | |
| 6,049,866 A | 4/2000 | Earl | |
| 6,085,296 A | 7/2000 | Karkhanis et al. | |
| 6,085,315 A | 7/2000 | Fleck et al. | |
| 6,101,599 A | 8/2000 | Wright et al. | |
| 6,105,119 A | 8/2000 | Kerr et al. | |
| 6,119,215 A | 9/2000 | Key et al. | |
| 6,145,072 A | 11/2000 | Shams et al. | |
| 6,151,668 A | 11/2000 | Pechanek et al. | |
| 6,164,841 A | 12/2000 | Mattson et al. | |
| 6,272,598 B1* | 8/2001 | Arlitt et al. | 711/133 |
| 6,292,888 B1 | 9/2001 | Nemirovsky et al. | |
| 6,370,622 B1* | 4/2002 | Chiou et al. | 711/146 |
| 6,434,669 B1* | 8/2002 | Arimilli et al. | 711/128 |
| 6,446,171 B1 | 9/2002 | Henriksen | |
| 6,493,817 B1 | 12/2002 | Renstrom | |
| 6,519,605 B1 | 2/2003 | Gilgen et al. | |
| 6,567,895 B2 | 5/2003 | Scales | |
| 6,591,347 B2* | 7/2003 | Tischler et al. | 711/134 |
| 6,625,662 B1 | 9/2003 | Satoh et al. | |
| 6,668,307 B1 | 12/2003 | Damron | |
| 6,668,308 B2 | 12/2003 | Barroso et al. | |
| 6,675,284 B1 | 1/2004 | Warren | |
| 6,697,932 B1 | 2/2004 | Yoaz et al. | |
| 6,725,317 B1 | 4/2004 | Bouchier et al. | |
| 6,823,429 B1 | 11/2004 | Olnowich | |
| 6,832,184 B1 | 12/2004 | Bleier et al. | |
| 6,877,086 B1 | 4/2005 | Boggs et al. | |
| 6,891,828 B2 | 5/2005 | Ngai | |
| 6,898,791 B1 | 5/2005 | Chandy et al. | |
| 6,915,402 B2 | 7/2005 | Wilson et al. | |
| 6,938,253 B2 | 8/2005 | Kim | |
| 6,950,438 B1 | 9/2005 | Owen et al. | |
| 6,973,032 B1 | 12/2005 | Casley et al. | |
| 6,988,149 B2 | 1/2006 | Odenwald | |
| 7,010,580 B1 | 3/2006 | Fu et al. | |
| 7,015,909 B1 | 3/2006 | Morgan, III et al. | |
| 7,072,996 B2 | 7/2006 | Adusumilli et al. | |
| 7,162,560 B2 | 1/2007 | Taylor et al. | |
| 7,376,789 B2 | 5/2008 | Halleck et al. | |
| 7,394,288 B1 | 7/2008 | Agarwal | |
| 7,398,374 B2 | 7/2008 | DeLano | |
| 7,464,197 B2 | 12/2008 | Ganapathy et al. | |
| 7,478,225 B1 | 1/2009 | Brooks et al. | |
| 7,493,474 B1 | 2/2009 | Pechanek et al. | |
| 7,500,060 B1 | 3/2009 | Anderson et al. | |
| 7,502,378 B2 | 3/2009 | Lajolo et al. | |
| 7,521,961 B1 | 4/2009 | Anderson et al. | |
| 7,533,154 B1* | 5/2009 | Chen et al. | 709/213 |
| 7,539,124 B2 | 5/2009 | Rhim et al. | |
| 7,546,444 B1 | 6/2009 | Wolrich et al. | |
| 7,568,064 B2 | 7/2009 | Reblewski et al. | |
| 7,590,774 B2 | 9/2009 | Johns et al. | |
| 7,613,882 B1 | 11/2009 | Akkawi et al. | |
| 7,664,108 B2 | 2/2010 | Bahattab | |
| 7,689,738 B1 | 3/2010 | Williams et al. | |
| 7,701,252 B1 | 4/2010 | Chow et al. | |
| 7,861,065 B2 | 12/2010 | Heil et al. | |
| 7,886,084 B2 | 2/2011 | Chen et al. | |
| 7,913,010 B2 | 3/2011 | Hoover et al. | |
| 7,917,703 B2 | 3/2011 | Comparan et al. | |
| 7,958,340 B2 | 6/2011 | Hoover et al. | |
| 7,991,978 B2 | 8/2011 | Kuesel et al. | |
| 8,010,750 B2 | 8/2011 | Comparan et al. | |
| 8,018,466 B2 | 9/2011 | Hoover et al. | |
| 8,020,168 B2 | 9/2011 | Hoover et al. | |
| 8,040,799 B2 | 10/2011 | Hoover et al. | |
| 2002/0099833 A1 | 7/2002 | Steely et al. | |
| 2002/0178337 A1 | 11/2002 | Wilson et al. | |
| 2003/0065890 A1 | 4/2003 | Lyon | |
| 2004/0037313 A1 | 2/2004 | Gulati et al. | |
| 2004/0083341 A1 | 4/2004 | Robinson et al. | |
| 2004/0088487 A1 | 5/2004 | Barroso et al. | |
| 2004/0151197 A1 | 8/2004 | Hui | |
| 2004/0153579 A1 | 8/2004 | Shih et al. | |
| 2004/0216105 A1 | 10/2004 | Burky et al. | |
| 2004/0250046 A1 | 12/2004 | Gonzalez et al. | |
| 2004/0260906 A1 | 12/2004 | Landin et al. | |
| 2005/0044319 A1 | 2/2005 | Olukotun | |
| 2005/0086435 A1 | 4/2005 | Todoroki | |
| 2005/0097184 A1 | 5/2005 | Brown et al. | |
| 2005/0149689 A1 | 7/2005 | Sodani et al. | |
| 2005/0160209 A1 | 7/2005 | Van Doren et al. | |
| 2005/0166205 A1 | 7/2005 | Oskin et al. | |
| 2005/0198442 A1 | 9/2005 | Mandler | |
| 2005/0203988 A1 | 9/2005 | Nollet et al. | |
| 2005/0238035 A1 | 10/2005 | Riley | |
| 2006/0095920 A1 | 5/2006 | Gossens | |
| 2006/0101249 A1 | 5/2006 | Bacon et al. | |
| 2006/0203825 A1 | 9/2006 | Beigne et al. | |
| 2006/0209846 A1 | 9/2006 | Clermidy et al. | |
| 2006/0242393 A1 | 10/2006 | Park et al. | |
| 2007/0055826 A1 | 3/2007 | Morton et al. | |
| 2007/0055961 A1 | 3/2007 | Callister et al. | |
| 2007/0074191 A1 | 3/2007 | Geisinger | |
| 2007/0076739 A1 | 4/2007 | Manjeshwar et al. | |
| 2007/0271557 A1 | 11/2007 | Geisinger | |
| 2007/0283324 A1 | 12/2007 | Geisinger | |
| 2008/0028401 A1 | 1/2008 | Geisinger | |
| 2008/0133885 A1 | 6/2008 | Glew | |
| 2008/0134191 A1 | 6/2008 | Warrier et al. | |
| 2008/0181115 A1 | 7/2008 | Soulie et al. | |
| 2008/0186998 A1 | 8/2008 | Rijpkema | |
| 2008/0205432 A1 | 8/2008 | Gangwal | |
| 2008/0216073 A1 | 9/2008 | Yates et al. | |
| 2008/0307422 A1 | 12/2008 | Kurland et al. | |
| 2008/0320235 A1* | 12/2008 | Beckmann et al. | 711/144 |
| 2009/0019190 A1 | 1/2009 | Blocksome | |
| 2009/0083263 A1 | 3/2009 | Felch et al. | |
| 2009/0125574 A1 | 5/2009 | Mejdrich et al. | |
| 2009/0125703 A1 | 5/2009 | Mejdrich et al. | |
| 2009/0125706 A1 | 5/2009 | Hoover et al. | |
| 2009/0135739 A1 | 5/2009 | Hoover et al. | |
| 2009/0231349 A1 | 9/2009 | Mejdrich et al. | |
| 2009/0260013 A1 | 10/2009 | Heil et al. | |
| 2009/0282222 A1 | 11/2009 | Hoover et al. | |

OTHER PUBLICATIONS

Office Action, U.S. Appl. No. 11/936,873, Jul, 21, 2011.
Office Action, U.S. Appl. No. 12/031,738, Jul. 11, 2011.
Final Office Action, U.S. Appl. No. 12/060,559, Jul. 8, 2011.
Steve Furber, Future Trends in SOC Interconnect, Aug. 2000.
Bolotin, et al., The Power of Priority:NoC based Distributed Cache Coherency, May 21, 2007, IEEE, pp. 117-126.
Mereu, Gianni. "Conception, Analysis, Design and Realization of a Multi-socket Network-on-Chip Architecture and of the Binary Translation support for VLIW core targeted to Systems-on-Chip", Mar. 2007, 145 pages, accessible at http://www.diee.unica.it/driei/tesi/19_mereu.pdf.
Huneycutt et al. "Software Caching using Dynamic Binary Rewriting for Embedded Devices", 2001, Proceedings of the International Conference on Parallel Processing, 10 pages.
Cifuentes et al. "Walkabout—A Retargetable Dynamic Binary Translation Framework", Sun Microsystems Laboratories, Jan. 2002, 13 pages.
Kavaldijev et al. ("Providing QOS Guaranteed in a NOC by Virtual Channel Reservation"); 2006; pp. 1-12.
Monchiero ("Exploration of Distributed Shared Memory Architecture of NOC-Based Microprocessors", 2007) pp. 1-8.
Al-Hashimi; ("System-on-Chip—Net Generation Electronics", "Asynchronous on-chip networks"2006); Chapter 18 p. 1-32.
Final Office Action, U.S. Appl. No. 11/926,212, Aug. 23, 2010.
Final Office Action, U.S. Appl. No. 11/955,553, Sep. 13, 2010.
Final Office Action, U.S. Appl. No. 12/031,733, Aug. 19, 2010.
Notice of Allowance, U.S. Appl. No. 12/118,298, Aug. 18, 2010.
Office Action, U.S. Appl. No. 11/972,753, Oct. 4, 2010.
Office Action, U.S. Appl. No. 12/015,975, Jul. 22, 2010.
Office Action, U.S. Appl. No. 11/937,579, Sep. 16, 2010.
Office Action, U.S. Appl. No. 12/118,059, Sep. 1, 2010.
Office Action, U.S. Appl. No. 12/121,168, Oct. 5, 2010.
Office Action, U.S. Appl. No. 11/945,396, Mar. 3, 2011.
Final Office Action, U.S. Appl. No. 12/118,017, Mar. 28, 2011.
Final Office Action, U.S. Appl. No. 11/937,579, Feb. 23, 2011.

Office Action, U.S. Appl. No. 12/108,770, Apr. 12, 2011.
Final Office Action, U.S. Appl. No. 12/117,906, Mar. 28, 2011.
Office Action, U.S. Appl. No. 12/060.559, Apr. 1, 2011.
Nikolay Kvaldjiev et al., A Virtual Channel Network-on-chip for GT and BE traffic, Apr. 2006, IEEE Emerging VLSI Technologies and Architectures.
Office Action, U.S. Appl. No. 11/926,212, Dec. 7, 2010.
Office Action, U.S. Appl. No. 11/945,396, Dec. 9, 2010.
Notice of Allowance, U.S. Appl. No. 11/955,553, Nov. 22, 2010.
Notice of Allowance, U.S. Appl. No. 12/031,733, Nov. 16, 2010.
Office Action, U.S. Appl. No. 12/118,017, Dec. 8, 2010.
Office Action, U.S. Appl. No. 12/118,272, Dec. 2, 2010.
Office Action, U.S. Appl. No. 12/108,846, Dec. 2, 2010.
Final Office Action, U.S. Appl. No. 12/117,875, Nov. 10, 2010.
Office Action, U.S. Appl. No. 12/117,906, May 9, 2008.
Office Action, U.S. Appl. No. 12/060,559, Nov. 3, 2010.
Advisory Action, U.S. Appl. No. 11/926,212, Nov. 2, 2010.
Office Action Dated Jan. 29, 2010 in U.S. Appl. No. 11/945,396.
Final Office Action Dated Jan. 15, 2010 in U.S. Appl. No. 12/031,733.
1994-2010 China Academic Journal Electronic Publishing House, pp. 0-30 and pp. 31-66 (includes English abstract).
Final Office Action, U.S. Appl. No. 11/972,753, Feb. 18, 2011.
Final Office Action, U.S. Appl. No. 12/015,975, Jan. 7, 2011.
Final Office Action, U.S. Appl. No. 12/108,846, Feb. 17, 2011.
Final Office Action, U.S. Appl. No. 12/113,286, Feb. 18, 2011.
Final Office Action, U.S. Appl. No. 12,118,059, Feb. 17, 2011.
Final Office Action, U.S. Appl. No. 11/926,212, May 17, 2011.
U.S. Appl. No. 12/117,897, filed May 9, 2008, Hoover, et al.
U.S. Appl. No. 12/031,733, filed Feb. 15, 2008, Hoover, et al.
U.S. Appl. No. 12/108,846, filed Apr. 24, 2008, Kuesel, et al.
U.S. Appl. No. 12/108,770, filed Apr. 24, 2008, Mejdrich, et al.
U.S. Appl. No. 12/029,647, filed Feb. 12, 2008, Hoover, et al.
U.S. Appl. No. 12/118,017, filed May 9, 2008, Comparan, et al.
U.S. Appl. No. 12/118,059, filed May 9, 2008, Mejdrich, et al.
U.S. Appl. No. 12/117,875, filed May 9, 2008, Hoover, et al.
U.S. Appl. No. 12/121,222, filed May 15, 2008, Kriegel, et al.
U.S. Appl. No. 11/936,873, filed Nov. 8, 2007, Hoover, et al.
U.S. Appl. No. 12/135,364, filed Jun. 9, 2008, Hoover, et al.
U.S. Appl. No. 11/937,579, filed Nov. 9, 2007, Mejdrich, et al.
U.S. Appl. No. 12/102,033, filed Apr. 14, 2008, Heil, et al.
U.S. Appl. No. 12/118,272, filed May 9, 2008, Kuesel, et al.
U.S. Appl. No. 12/118,039, filed May 9, 2008, Hoover, et al.
U.S. Appl. No. 11/945,396, filed Nov. 27, 2007, Hoover, et al.
U.S. Appl. No. 12/015,975, filed Jan. 17, 2008, Comparan, et al.
U.S. Appl. No. 12/117,906, filed May 9, 2008, Hoover, et al.
U.S. Appl. No. 12/233,180, filed Sep. 18, 2008, Hoover, et al.
U.S. Appl. No. 12/113,286, filed May 1, 2008, Heil, et al.
U.S. Appl. No. 11/955,553, filed Dec. 13, 2007, Comparan, et al.
U.S. Appl. No. 12/031,738, filed Feb. 15, 2008, Hoover, et al.
U.S. Appl. No. 11/972,753, filed Jan. 11, 2008, Mejdrich, et al.
U.S. Appl. No. 12/060,559, filed Apr. 1, 2008, Comparan, et al.
U.S. Appl. No. 11/926,212, filed Oct. 29, 2007, Hoover, et al.
U.S. Appl. No. 12/118,298, filed May 9, 2008, Heil, et al.
U.S. Appl. No. 12/118,315, filed May 9, 2008, Mejdrich, et al.
U.S. Appl. No. 11/938,376, filed Nov. 12, 2007, Mejdrich, et al.
U.S. Appl. No. 12/121,168, filed May 15, 2008, Hoover, et al.
Office Action Dated Jul. 20, 2009 in U.S. Appl. No. 12/031,733.
Kuskin, et al.; The Stanford Flash Multiprocessor; Jun. 6, 1996; Stanford University.
David Taylor, et al. "System on Chip Packet Processor for an Experimental Network Service Platform". 2003.
Office Action Dated Mar. 30, 2010 in U.S. Appl. No. 11/926,212.
Final Office Action Dated May 19, 2010 in U.S. Appl. No. 11/945,396.
Intel, E8870 Chipset, Intel, Jun. 2002, pp. 1-10.

Office Action Dated Apr. 2, 2010 in U.S. Appl. No. 11/955,553.
Kumar, et al. "A Network on Chip Architecture and Design Methodology". Published 2002, pp. 1-8, ISBN 0-7695-1486-03/02 by IEEE.
Bolotin, et al. "The Power of Priority: NoC based Distributed Cache Coherency". Published May 21, 2007, pp. 117-126, ISBN 0-7695-2773-06/07 by IEEE.
Office Action Dated Mar. 24, 2010 in U.S. Appl. No. 12/031,733.
Walter, et al., "BENoC: A Bus-Enhanced Network on-Chip". Dec. 2007, Technion, Israel Institute of Technology, Haifa, Israel.
Office Action Dated Jun. 8, 2010 in U.S. Appl. No. 12/118,298.
Office Action Dated May 26, 2010 in U.S. Appl. No. 12/117,875.
Kumar et al.; "A Network on Chip Architecture and Design Methodology";2002; IEEE.
Final Office Action, U.S. Appl. No. 11/945,396, Sep. 1, 2011.
Final Office Action, U.S. Appl. No. 11/972,753, Sep. 7, 2011.
Office Action, U.S. Appl. No. 12/135,364, Aug. 5, 2011.
Office Action, U.S. Appl. No. 12/102,033, Oct. 7, 2011.
Office Action, U.S. Appl. No. 11/937,579, Aug. 15, 2011.
Office Action, U.S. Appl. No. 12/233,180, Oct. 6, 2011.
Office Action, U.S. Appl. No. 12/121,222, Sep. 20, 2011.
Master Dissertation, University of Electronic Science and Technology of China, 2007, pp. 0-35 and pp. 36-81 (includes English abstract).
Virtanen, "NoC Interface for a Protocol Processor", Proceedings of the 21st IEEE NORCHIP Conference, Nov. 2003, pp. 31-34, University of Turku, Finland.
Wikipedia, "Parallel Computing", Wikipedia [online], URL: http://en.wikipedia.org/wiki/Parallel_computing, Jan. 19, 2007, pp. 1-6, USA.
Pande et al., "Performance Evaluation and Design Trade-Offs for Network-on-Chip Interconnect Architectures", IEEE Transactions on Computers, vol. 54, No. 8, Aug. 2005, pp. 1025-1040, IEEE Computer Society, USA.
Radulescu et al., "An Efficient On-Chip Network Interface Offering Guaranteed Services, Shared-Memory Abstraction, and Flexible Network Configuration", from Proceedings of the Design, Automation and Test in Europe Conference and Exhibition (DATE'04), held in Paris, France Feb. 2004, pp. 878-883, vol. 2, IEEE Computer Society, USA.
Mereu, "Conception, Analysis, Design and Realization of a Multi-socket Network-on-Chip Architecture and of the Binary Translation support for VLIW core targeted to Systems-on-Chip", Mar. 2007, 145 pages, accessible at http://www.diee.unica.it/driei/tesi/19_mereu.pdf.
Samman et al., "Networks-On-Chip Based on Dynamic Wormhole Packet Identity Mapping Management", VLSI Design, Aug. 7, 2008, 15 pp., vol. 2009, Article ID 941701, Hindawi Publishing Corporation, USA.
Issenin et al., "Date Reuse Driven Memorty and Network-On-Chip Co-Synthesis", NSF, (date unknown) pp. 1-7.
Final Office Action, U.S. Appl. No. 12/108,770, Sep. 30, 2011.
Notice of Allowance, U.S. Appl. No. 12/029,647, Feb. 25, 2011.
Office Action, U.S. Appl. No. 12/118,315, Jul. 26, 2011.
Notice of Allowance, U.S. Appl. No. 12/015,975, Apr. 15, 2011.
Notice of Allowance, U.S. Appl. No. 12/118,272, Mar. 22, 2011.
Office Action, U.S. Appl. No. 11/938,376, Oct. 18, 2011.
Notice of Allowance, U.S. Appl. No. 12/108,846, May 13, 2011.
Notice of Allowance, U.S. Appl. No. 12/117,875, Jan. 27, 2011.
Notice of Allowance, U.S. Appl. No. 12/117,897, May 4, 2011.
Office Action, U.S. Appl. No. 12/113,286, Oct. 14, 2010.
Notice of Allowance, U.S. Appl. No. 12/121,168, Mar. 22, 2011.
Notice of Allowance, U.S. Appl. No. 12/121,168, Sep. 9, 2011.
Final Office Action, U.S. Appl. No. 11/936,873, Dec. 30, 2011.
Final Office Action, U.S. Appl. No. 12/031,738, Dec. 22, 2011.

* cited by examiner

NETWORK ON CHIP WITH CACHING RESTRICTIONS FOR PAGES OF COMPUTER MEMORY

BACKGROUND OF THE INVENTION

1. Field of the Invention

The field of the invention is data processing, or, more specifically apparatus and methods for data processing with a network on chip ('NOC').

2. Description of Related Art

There are two widely used paradigms of data processing; multiple instructions, multiple data ('MIMD') and single instruction, multiple data ('SIMD'). In MIMD processing, a computer program is typically characterized as one or more threads of execution operating more or less independently, each requiring fast random access to large quantities of shared memory. MIMD is a data processing paradigm optimized for the particular classes of programs that fit it, including, for example, word processors, spreadsheets, database managers, many forms of telecommunications such as browsers, for example, and so on.

SIMD is characterized by a single program running simultaneously in parallel on many processors, each instance of the program operating in the same way but on separate items of data. SIMD is a data processing paradigm that is optimized for the particular classes of applications that fit it, including, for example, many forms of digital signal processing, vector processing, and so on.

There is another class of applications, however, including many real-world simulation programs, for example, for which neither pure SIMD nor pure MIMD data processing is optimized. That class of applications includes applications that benefit from parallel processing and also require fast random access to shared memory. For that class of programs, a pure MIMD system will not provide a high degree of parallelism and a pure SIMD system will not provide fast random access to main memory stores.

SUMMARY OF THE INVENTION

A network on chip ('NOC') that includes integrated processor ('IP') blocks, routers, memory communications controllers, and network interface controllers, each IP block adapted to a router through a memory communications controller and a network interface controller, a multiplicity of computer processors, each computer processor implementing a plurality of hardware threads of execution; and computer memory, the computer memory organized in pages and operatively coupled to one or more of the computer processors, the computer memory including a set associative cache, the cache comprising cache ways organized in sets, the cache being shared among the hardware threads of execution, each page of computer memory restricted for caching by one replacement vector of a class of replacement vectors to particular ways of the cache, each page of memory further restricted for caching by one or more bits of a replacement vector classification to particular sets of ways of the cache.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
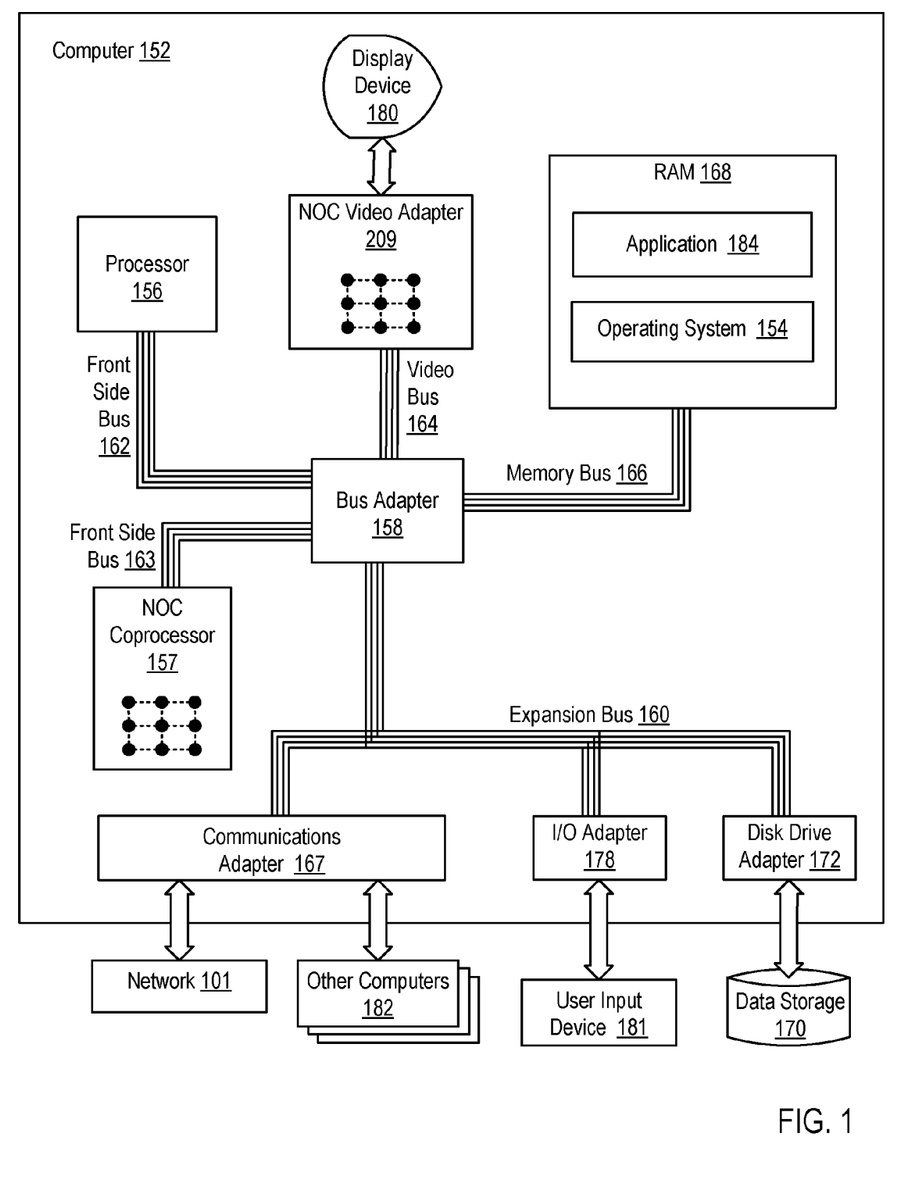
FIG. 1 sets forth a block diagram of automated computing machinery comprising an exemplary computer useful in data processing with a NOC according to embodiments of the present invention.

Exemplary apparatus and methods for data processing with a NOC in accordance with the present invention are described with reference to the accompanying drawings, beginning with FIG. 1. FIG. 1 sets forth a block diagram of automated computing machinery comprising an exemplary computer (152) useful in data processing with a NOC according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an application program (184), a module of user-level computer program instructions for carrying out particular data processing tasks such as, for example, word processing, spreadsheets, database operations, video gaming, stock market simulations, atomic quantum process simulations, or other user-level applications. Also stored in RAM (168) is an operating system (154). Operating systems useful data processing with a NOC according to embodiments of the present invention include UNIX™, Linux™, Microsoft XP™, AIX™, IBM's i5/OS™, and others as will occur to those of skill in the art. The operating system (154) and the application (184) in the example of FIG. 1 are shown in RAM (168), but many components of such software typically are stored in non-volatile memory also, such as, for example, on a disk drive (170).

The example computer (152) includes two example NOCs according to embodiments of the present invention: a video adapter (209) and a coprocessor (157). The video adapter (209) is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example NOC coprocessor (157) is connected to processor (156) through bus adapter (158), and front side buses (162 and 163), which is also a high speed bus. The NOC coprocessor of FIG. 1 is optimized to accelerate particular data processing tasks at the behest of the main processor (156).

The example NOC video adapter (209) and NOC coprocessor (157) of FIG. 1 each include a NOC according to embodiments of the present invention, including integrated processor ('IP') blocks, routers, memory communications controllers, and network interface controllers, each IP block adapted to a router through a memory communications controller and a network interface controller, each memory communications controller controlling communication between an IP block and memory, and each network interface controller controlling inter-IP block communications through routers. The NOC video adapter and the NOC coprocessor are optimized for programs that use parallel processing and also require fast random access to shared memory. The details of the NOC structure and operation are discussed below with reference to FIGS. 2-4.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for data processing with a NOC according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for data processing with a NOC according to embodiments of the present invention include modems for wired dial-up communications, Ethernet (IEEE 802.3) adapters for wired data communications network communications, and 802.11 adapters for wireless data communications network communications.

Figure 2:
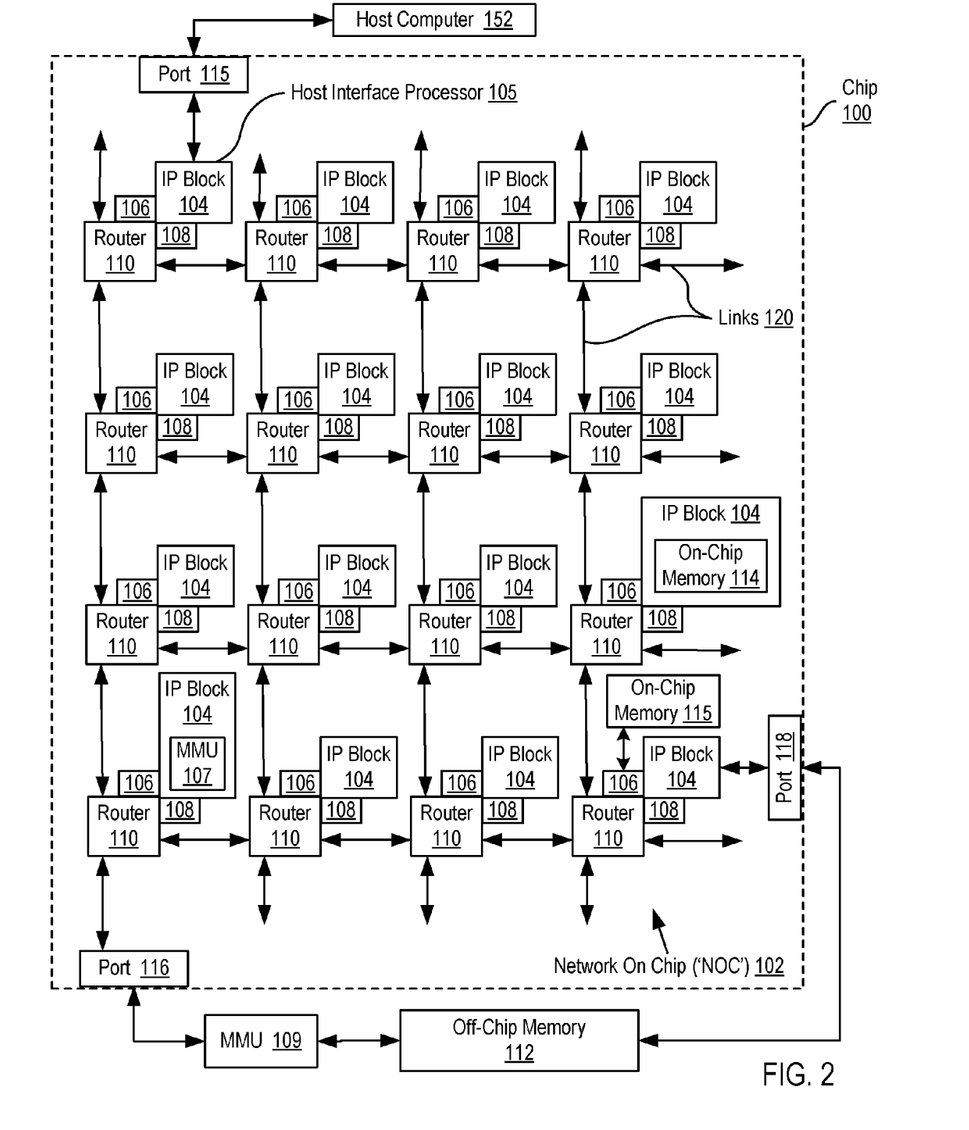
FIG. 2 sets forth a functional block diagram of an example NOC according to embodiments of the present invention.

For further explanation, FIG. 2 sets forth a functional block diagram of an example NOC (102) according to embodiments of the present invention. The NOC in the example of FIG. 1 is implemented on a 'chip' (100), that is, on an integrated circuit. The NOC (102) of FIG. 2 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110).

In the NOC (102) of FIG. 2, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs according to embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well.

Each IP block (104) in the example of FIG. 2 is adapted to a router (110) through a memory communications controller (106). Each memory communication controller is an aggregation of synchronous and asynchronous logic circuitry adapted to provide data communications between an IP block and memory. Examples of such communications between IP blocks and memory include memory load instructions and memory store instructions. The memory communications controllers (106) are described in more detail below with reference to FIG. 3.

Each IP block (104) in the example of FIG. 2 is also adapted to a router (110) through a network interface controller (108). Each network interface controller (108) controls communications through routers (110) between IP blocks (104). Examples of communications between IP blocks include messages carrying data and instructions for processing the data among IP blocks in parallel applications and in pipelined applications. The network interface controllers (108) are described in more detail below with reference to FIG. 3.

Each IP block (104) in the example of FIG. 2 is adapted to a router (110). The routers (110) and links (120) among the routers implement the network operations of the NOC. The links (120) are packets structures implemented on physical, parallel wire buses connecting all the routers. That is, each link is implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wise, 512 wires. In addition, each link is bi-directional, so that if the link packet structure includes 64 bytes, the wire bus actually contains 1024 wires between each router and each of its neighbors in the network. A message can includes more than one packet, but each packet fits precisely onto the width of the wire bus. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller (106) in the example of FIG. 2 controls communications between an IP block and memory. Memory can include off-chip main RAM (112), memory (115) connected directly to an IP block through a memory communications controller (106), on-chip memory enabled as an IP block (114), and on-chip caches. In the NOC of FIG. 2, either of the on-chip memories (114, 115), for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory (114) on an IP block can be addressed from that IP block or from any other IP block in the NOC. Memory (115) attached directly to a memory communication controller can be addressed by the IP block that is adapted to the network by that memory communication controller—and can also be addressed from any other IP block anywhere in the NOC.

The example NOC includes two memory management units ('MMUs') (107, 109), illustrating two alternative memory architectures for NOCs according to embodiments of the present invention. MMU (107) is implemented with an IP block, allowing a processor within the IP block to operate in virtual memory while allowing the entire remaining architecture of the NOC to operate in a physical memory address space. The MMU (109) is implemented off-chip, connected to the NOC through a data communications port (116). The port (116) includes the pins and other interconnections required to conduct signals between the NOC and the MMU, as well as sufficient intelligence to convert message packets from the NOC packet format to the bus format required by the external MMU (109). The external location of the MMU means that all processors in all IP blocks of the NOC can operate in virtual memory address space, with all conversions to physical addresses of the off-chip memory handled by the off-chip MMU (109).

In addition to the two memory architectures illustrated by use of the MMUs (107, 109), data communications port (118) illustrates a third memory architecture useful in NOCs according to embodiments of the present invention. Port (118) provides a direct connection between an IP block (104) of the NOC (102) and off-chip memory (112). With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port (118). The port (118) includes the pins and other interconnections required to conduct signals between the NOC and the off-chip memory (112), as well as sufficient intelligence to convert message packets from the NOC packet format to the bus format required by the off-chip memory (112).

In the example of FIG. 2, one of the IP blocks is designated a host interface processor (105). A host interface processor (105) provides an interface between the NOC and a host computer (152) in which the NOC may be installed and also provides data processing services to the other IP blocks on the NOC, including, for example, receiving and dispatching among the IP blocks of the NOC data processing requests from the host computer. A NOC may, for example, implement a video graphics adapter (209) or a coprocessor (157) on a larger computer (152) as described above with reference to FIG. 1. In the example of FIG. 2, the host interface processor (105) is connected to the larger host computer through a data communications port (115). The port (115) includes the pins and other interconnections required to conduct signals between the NOC and the host computer, as well as sufficient intelligence to convert message packets from the NOC to the bus format required by the host computer (152). In the example of the NOC coprocessor in the computer of FIG. 1, such a port would provide data communications format translation between the link structure of the NOC coprocessor (157) and the protocol required for the front side bus (163) between the NOC coprocessor (157) and the bus adapter (158).

Figure 3:
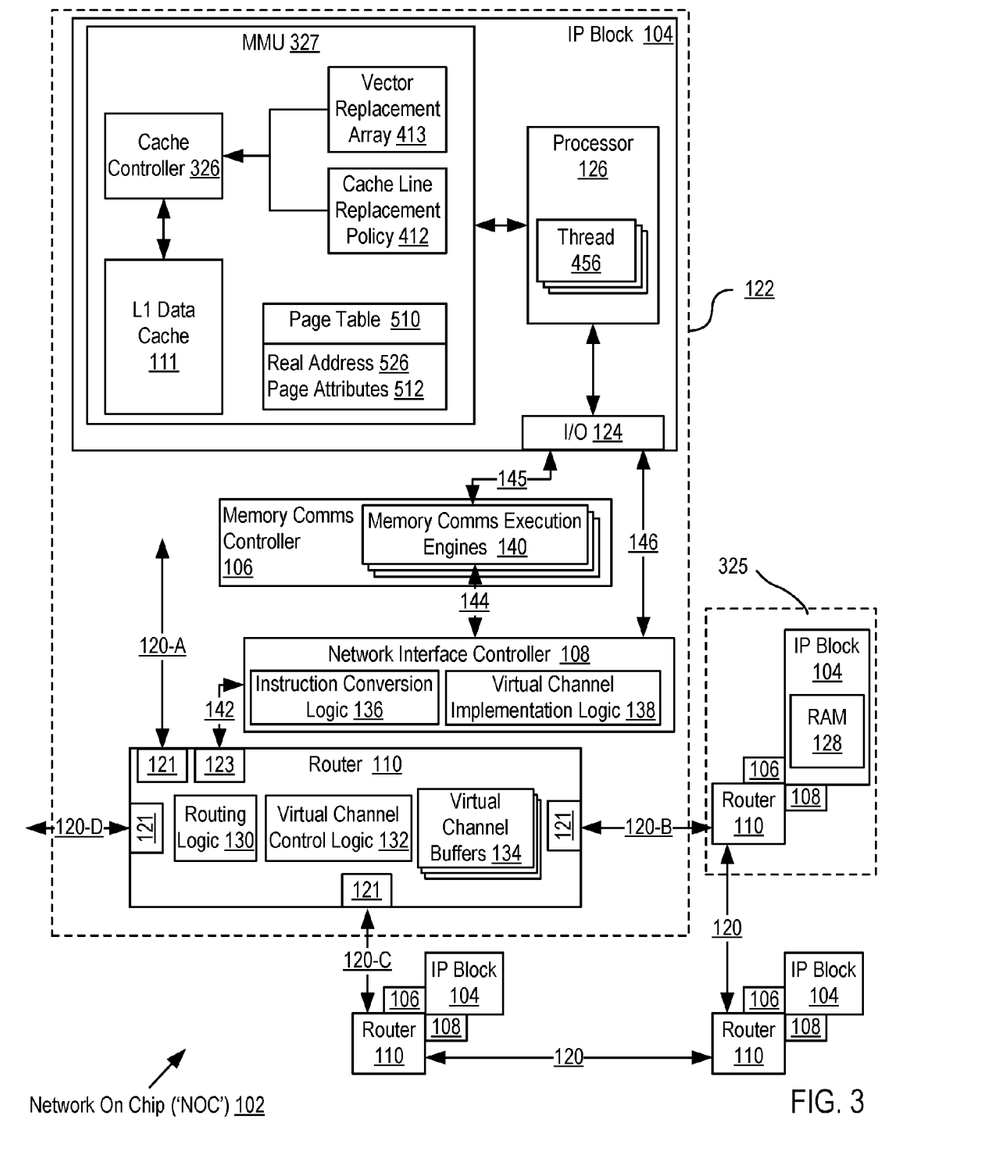
FIG. 3 sets forth a functional block diagram of a further example NOC according to embodiments of the present invention.

For further explanation, FIG. 3 sets forth a functional block diagram of a further example NOC according to embodiments of the present invention. The example NOC of FIG. 3 is similar to the example NOC of FIG. 2 in that the example NOC of FIG. 3 is implemented on a chip (100 on FIG. 2), and the NOC (102) of FIG. 3 includes integrated processor ('IP') blocks (104), routers (110), memory communications controllers (106), and network interface controllers (108). Each IP block (104) is adapted to a router (110) through a memory communications controller (106) and a network interface controller (108). Each memory communications controller controls communications between an IP block and memory, and each network interface controller (108) controls inter-IP block communications through routers (110). In the example of FIG. 3, one set (122) of an IP block (104) adapted to a router (110) through a memory communications controller (106) and network interface controller (108) is expanded to aid a more detailed explanation of their structure and operations. All the IP blocks, memory communications controllers, network interface controllers, and routers in the example of FIG. 3 are configured in the same manner as the expanded set (122).

In the example of FIG. 3, each IP block (104) includes a computer processor (126) and I/O functionality (124). In this example, computer memory is represented by a segment of random access memory ('RAM') (128) in each IP block (104). The memory, as described above with reference to the example of FIG. 2, can occupy segments of a physical address space whose contents on each IP block are addressable and accessible from any IP block in the NOC. The processors (126), I/O capabilities (124), and memory (128) on each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

Each computer processor (126) in the example of FIG. 3 implements a plurality of hardware threads (456) of execution. The threads are hardware threads in that the support for the threads is built into the processor itself in the form of a separate architectural register set for each thread, so that each thread can execute simultaneously with no need for context switches among the threads. Each such hardware thread can run multiple software threads of execution implemented with the software threads assigned to portions of processor time called 'quanta' or 'time slots' and context switches that save the contents of a set of architectural registers for a software thread during periods when that software thread loses possession of its assigned hardware thread.

The NOC (102) of FIG. 3 also includes computer memory in the form of RAM (128) of the expanded set (325) and a level-1 ('L1') data cache (111) of the expanded set (122). The computer memory (128) of FIG. 3 is organized in pages and managed by a memory management unit ('MMU') (327). The cache (111) is a set associative cache controlled by a cache controller (326) of a memory management unit (327) in accordance with a cache line replacement policy. The cache includes cache ways organized in sets where the cache is shared among the hardware threads of execution. Such an associative cache can be described as an N-way, set associative computer memory cache, where N is greater than or equal to 2.

The MMU may manage computer memory by translating virtual memory addresses into real addresses (526), through use of a page table (510) and page attributes (512), restricting each page of computer memory for caching by one replacement vector of a class of replacement vectors to particular ways of the cache; restricting each page of memory for caching by one or more bits of a replacement vector classification to particular sets of ways of the cache.

One page attribute (512) in the example page table (510) of FIG. 3, is a replacement vector classification used to restrict each page of computer memory for caching to particular ways of the cache and particular sets of ways of the cache. That is, upon a memory access instruction, such as a load or store instruction, to a virtual memory address, the MMU may translate the virtual memory address to a real address (526) that includes a tag and an index, replace, with one or more bits of a replacement vector classification, one or more bits in the cache index for a cache line of a memory page; and preserving an original value of the cache index for the cache line by adding the one or more replaced bits to a corresponding cache line tag.

The result is a modified real address, a string of bits that the MMU passes to the cache controller (326) for determining whether the address is cached. The cache controller (326) may determine whether the address is cached by determining whether the tag is stored in a particular way of the cache. The cache controller may determine whether the tag is stored in a particular way of the cache by using the replacement vector classification as an index into an array (413) of replacement vectors where each replacement vector identifies particular ways in which the tag may be stored, using the index of the modified real address to identify a particular set of ways in which the tag may be stored, and searching the particular ways in the particular set for the tag. If tag is not found, a cache miss occurs and the cache controller (326) may use the cache line replacement policy to identify one of the particular ways in the particular set of ways to evict from the cache.

In the NOC (102) of FIG. 3, each memory communications controller (106) includes a plurality of memory communications execution engines (140). Each memory communications execution engine (140) is enabled to execute memory communications instructions from an IP block (104), including bidirectional memory communications instruction flow (142, 144, 145) between the network and the IP block (104). The memory communications instructions executed by the memory communications controller may originate, not only from the IP block adapted to a router through a particular memory communications controller, but also from any IP block (104) anywhere in the NOC (102). That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine (140) is enabled to execute a complete memory communications instruction separately and in parallel with other memory communications execution engines. The memory communications execution engines implement a scalable memory transaction processor optimized for concurrent throughput of memory communications instructions. The memory communications controller (106) supports multiple memory communications execution engines (140) all of which run concurrently for simultaneous execution of multiple memory communications instructions. A new memory communications instruction is allocated by the memory communications controller (106) to a memory communications engine (140) and the memory communications execution engines (140) can accept multiple response events simultaneously. In this example, all of the memory communications execution engines (140) are identical. Scaling the number of memory communications instructions that can be handled simultaneously by a memory communications controller (106), therefore, is implemented by scaling the number of memory communications execution engines (140).

In the NOC (102) of FIG. 3, each network interface controller (108) is enabled to convert communications instructions from command format to network packet format for transmission among the IP blocks (104) through routers (110). The communications instructions are formulated in command format by the IP block (104) or by the memory communications controller (106) and provided to the network interface controller (108) in command format. The command format is a native format that conforms to architectural register files of the IP block (104) and the memory communications controller (106). The network packet format is the format required for transmission through routers (110) of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In the NOC (102) of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. All memory-address-based communication that are executed with message traffic are passed from the memory communications controller to an associated network interface controller for conversion (136) from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller (106) is naturally also the network location of that memory communication controller's associated router (110), network interface controller (108), and IP block (104). The instruction conversion logic (136) within each network interface controller is capable of converting memory addresses to network addresses for purposes of transmitting memory-address-based communications through routers of a NOC.

Upon receiving message traffic from routers (110) of the network, each network interface controller (108) inspects each packet for memory instructions. Each packet containing a memory instruction is handed to the memory communications controller (106) associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In the NOC (102) of FIG. 3, each IP block (104) is enabled to bypass its memory communications controller (106) and send inter-IP block, network-addressed communications (146) directly to the network through the IP block's network interface controller (108). Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through it I/O functions (124) directly to the IP block's network interface controller in command format, then converted to packet format by the network interface controller and transmitted through routers of the NOC to another IP block. Such network-addressed communications (146) are bi-directional, potentially proceeding to and from each IP block of the NOC, depending on their use in any particular application. Each network interface controller, however, is enabled to both send and receive (142) such communications to and from an associated router, and each network interface controller is enabled to both send and receive (146) such communications directly to and from an associated IP block, bypassing an associated memory communications controller (106).

Each network interface controller (108) in the example of FIG. 3 is also enabled to implement virtual channels on the network, characterizing network packets by type. Each network interface controller (108) includes virtual channel implementation logic (138) that classifies each communication instruction by type and records the type of instruction in a field of the network packet format before handing off the instruction in packet form to a router (110) for transmission on the NOC. Examples of communication instruction types include inter-IP block network-address-based messages, request messages, responses to request messages, invalidate messages directed to caches; memory load and store messages; and responses to memory load messages, and so on.

Each router (110) in the example of FIG. 3 includes routing logic (130), virtual channel control logic (132), and virtual channel buffers (134). The routing logic typically is implemented as a network of synchronous and asynchronous logic that implements a data communications protocol stack for data communication in the network formed by the routers (110), links (120), and bus wires among the routers.

The routing logic (130) includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed. Each router in this example includes five ports, four ports (121) connected through bus wires (120-A, 120-B, 120-C, 120-D) to other routers and a fifth port (123) connecting each router to its associated IP block (104) through a network interface controller (108) and a memory communications controller (106).

In describing memory-address-based communications above, each memory address was described as mapped by network interface controllers to a network address, a network location of a memory communications controller. The network location of a memory communication controller (106) is naturally also the network location of that memory communication controller's associated router (110), network interface controller (108), and IP block (104). In inter-IP block, or network-address-based communications, therefore, it is also typical for application-level data processing to view network addresses as location of IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x,y coordinates of each such set in the mesh.

In the NOC (102) of FIG. 3, each router (110) implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router (110) in the example of FIG. 3 also includes virtual channel control logic (132) and virtual channel buffers (134). The virtual channel control logic (132) examines each received packet for its assigned communications type and places each packet in an outgoing virtual channel buffer for that communications type for transmission through a port to a neighboring router on the NOC.

Each virtual channel buffer (134) has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer (134) in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller (108). Each network interface controller is configured to, upon receipt of such a signal, refuse to accept, from its associated memory communications controller (106) or from its associated IP block (104), communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped in the architecture of FIG. 3. When a router encounters a situation in which a packet might be dropped in some unreliable protocol such as, for example, the Internet Protocol, the routers in the example of FIG. 3 suspend by their virtual channel buffers (134) and their virtual channel control logic (132) all transmissions of packets in a virtual channel until buffer space is again available, eliminating any need to drop packets. The NOC of FIG. 3, therefore, implements highly reliable network communications protocols with an extremely thin layer of hardware.

Figure 4:
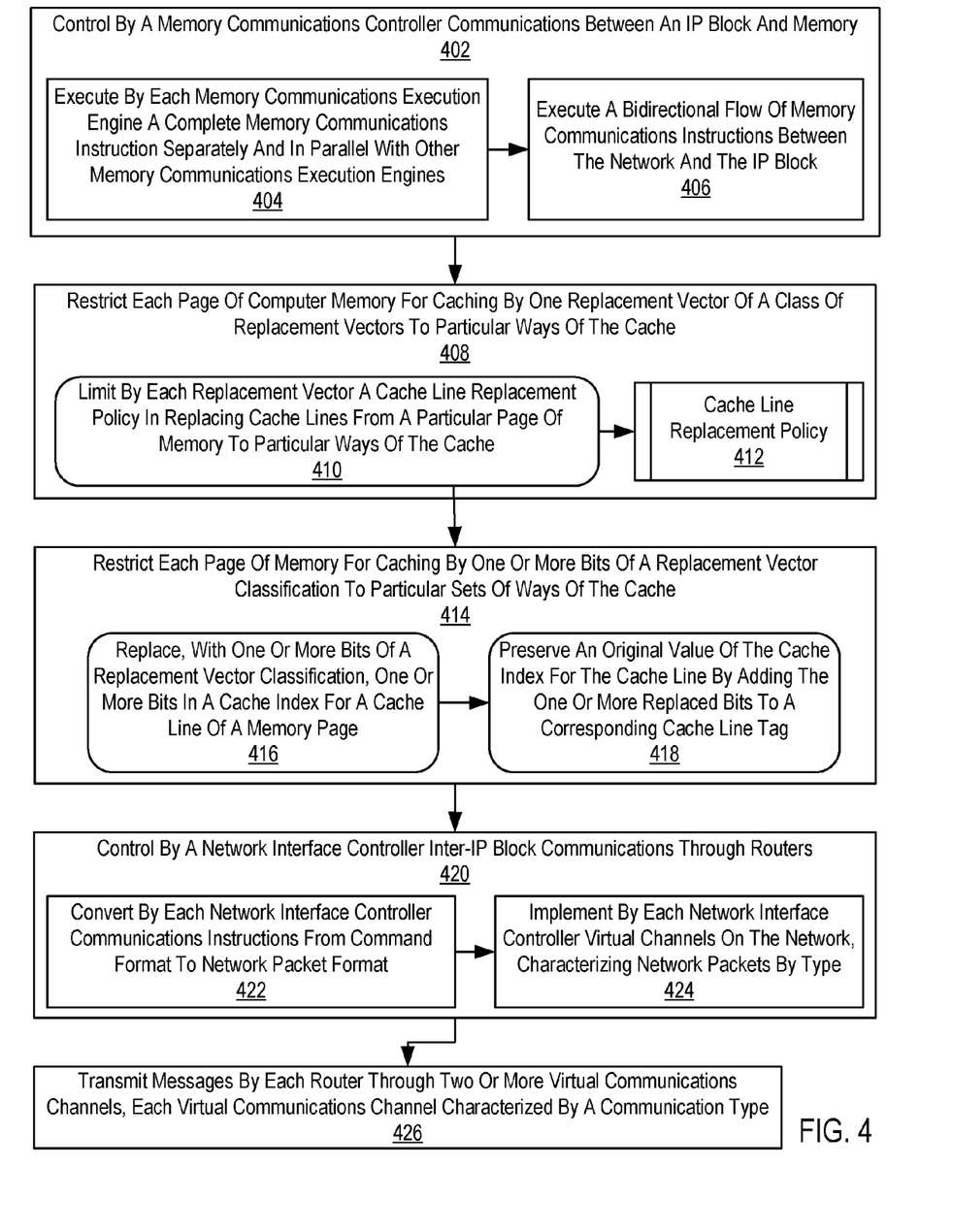
FIG. 4 sets forth a flow chart illustrating an exemplary method for data processing with a NOC according to embodiments of the present invention.

For further explanation, FIG. 4 sets forth a flow chart illustrating an exemplary method for data processing with a NOC according to embodiments of the present invention. The method of FIG. 4 is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3). In the method of FIG. 4, each IP block may be implemented as a reusable unit of synchronous or asynchronous logic design used as a building block for data processing within the NOC.

The NOC (102 on FIG. 3) also includes a multiplicity of computer processors (126 on FIG. 3) within the IP blocks (104 on FIG. 3) where each computer processor (126 on FIG. 3) implements a plurality of hardware threads (456 on FIG. 3) of execution. The NOC (102 on FIG. 3) also includes computer memory (128, 111 on FIG. 3) where the computer memory is organized in pages and is operatively coupled to one or more of the computer processors (126 on FIG. 3). The computer memory includes a set associative cache (111 on FIG. 3). The cache includes cache ways organized in sets where the cache is shared among the hardware threads (456 on FIG. 3) of execution.

The method of FIG. 4 includes controlling (402) by a memory communications controller (106 on FIG. 3) communications between an IP block and memory. In the method of FIG. 4, the memory communications controller includes a plurality of memory communications execution engines (140 on FIG. 3). Also in the method of FIG. 4, controlling (402) communications between an IP block and memory is carried out by executing (404) by each memory communications execution engine a complete memory communications instruction separately and in parallel with other memory communications execution engines and executing (406) a bidirectional flow of memory communications instructions between the network and the IP block. In the method of FIG. 4, memory communications instructions may include translation lookaside buffer control instructions, cache control instructions, barrier instructions, memory load instructions, and memory store instructions. In the method of FIG. 4, memory may include off-chip main RAM, memory connected directly to an IP block through a memory communications controller, on-chip memory enabled as an IP block, and on-chip caches.

The method of FIG. 4 includes restricting (408) each page of computer memory for caching by one replacement vector of a class of replacement vectors to particular ways of the cache. In the method of FIG. 4 restricting (408) each page of computer memory for caching by one replacement vector of a class of replacement vectors to particular ways of the cache may include limiting (410) by each replacement vector a cache line replacement policy (412) in replacing cache lines from a particular page of memory to particular ways of the cache.

A cache line replacement policy is an algorithm, implemented by computer program instructions or a hardware aggregation of logic, for managing information stored in cache. When the cache is full, the replacement policy identifies which item in the cache to evict from the cache in order to make room for new information. New information may be stored in cache upon a miss in the cache of that information. That is, a cache miss generally results in an eviction of a cache line from cache.

A least recently used type ('LRU-type') replacement policy is an algorithm that identifies the first information in a cache to evict as the least recently used information. This type of algorithm tracks when cache lines are accessed. Some implementations of LRU-type replacement policies track when cache lines are accessed by maintaining LRU attributes for the lines or ways of cache. An example of LRU attributes maintained by a cache controller is a set of 'age bits' for a cache lines. In such an implementation, every time a cache line is accessed, the age of all other cache lines are modified. This is just one example implementation of an LRU-type replacement policy, used here for clarity, but readers of skill in the art will recognize that many variations of LRU-type replacement policies may be useful in NOCs according to embodiments of the present invention. Limiting (410) a cache line replacement policy (412) in replacing cache lines from a particular page of memory to particular ways of the cache reduces the number of ways for which LRU attributes are compared for identifying a particular way for eviction, thereby reducing computational overhead of selecting a way to evict.

The method of FIG. 4 also includes restricting (414) each page of memory for caching by one or more bits of a replacement vector classification to particular sets of ways of the cache. In the method of FIG. 4, restricting (414) each page of memory for caching by one or more bits of a replacement vector classification to particular sets of ways of the cache may include replacing (416), with one or more bits of a replacement vector classification, bits in a cache index for a cache line of a memory page and preserving (418) an original value of the cache index for the cache line by adding the one or more replaced bits to a corresponding cache line tag.

The method of FIG. 4 also includes controlling (420) by a network interface controller (108 on FIG. 3) inter-IP block communications through routers. In the method of FIG. 4, controlling (420) inter-IP block communications also includes converting (422) by each network interface controller communications instructions from command format to network packet format and implementing (424) by each network interface controller virtual channels on the network, including characterizing network packets by type.

The method of FIG. 4 also includes transmitting (426) messages by each router (110 on FIG. 3) through two or more virtual communications channels, where each virtual communications channel is characterized by a communication type. Communication instruction types, and therefore virtual channel types, include, for example: inter-IP block network-address-based messages, request messages, responses to request messages, invalidate messages directed to caches; memory load and store messages; and responses to memory load messages, and so on. In support of virtual channels, each router also includes virtual channel control logic (132 on FIG. 3) and virtual channel buffers (134 on FIG. 3). The virtual channel control logic examines each received packet for its assigned communications type and places each packet in an outgoing virtual channel buffer for that communications type for transmission through a port to a neighboring router on the NOC.

Figure 5:
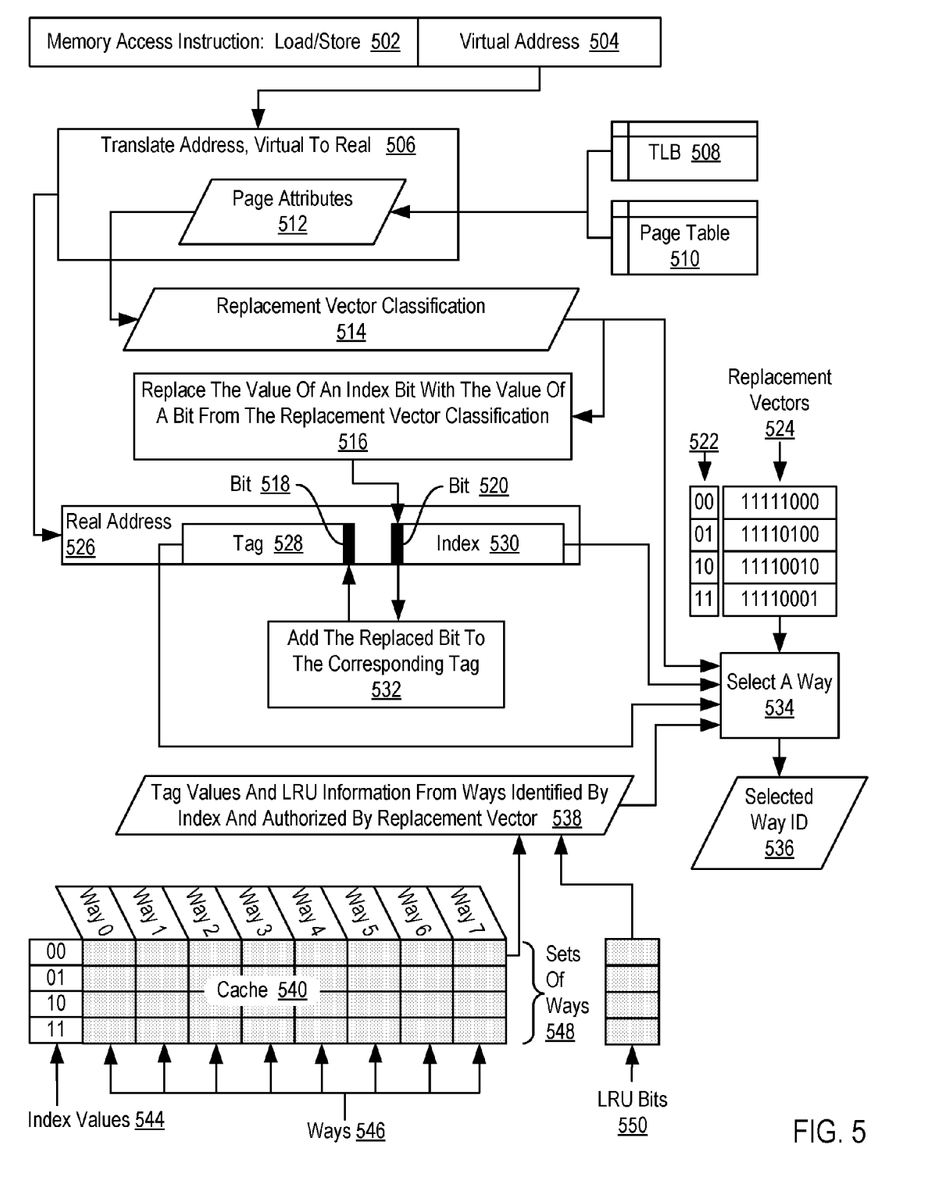
FIG. 5 sets forth a data flow diagram illustrating an exemplary method for data processing with a NOC according to embodiments of the present invention.

For further explanation, FIG. 5 sets forth a data flow diagram illustrating an exemplary method for data processing with a NOC according to embodiments of the present invention. The method of FIG. 5 is implemented on a NOC similar to the ones described above in this specification, a NOC (102 on FIG. 3) that is implemented on a chip (100 on FIG. 3) with IP blocks (104 on FIG. 3), routers (110 on FIG. 3), memory communications controllers (106 on FIG. 3), and network interface controllers (108 on FIG. 3). Each IP block (104 on FIG. 3) is adapted to a router (110 on FIG. 3) through a memory communications controller (106 on FIG. 3) and a network interface controller (108 on FIG. 3). In the method of FIG. 5, each IP block may be implemented as a reusable unit of synchronous or asynchronous logic design used as a building block for data processing within the NOC.

The NOC (102 on FIG. 3) also includes a multiplicity of computer processors (126 on FIG. 3) within the IP blocks (104 on FIG. 3) where each computer processor (126 on FIG. 3) implements a plurality of hardware threads (456 on FIG. 3) of execution. The NOC (102 on FIG. 3) also includes computer memory (128, 111 on FIG. 3) where the computer memory is organized in pages and is operatively coupled to one or more of the computer processors (126 on FIG. 3). The computer memory includes a set associative cache (111 on FIG. 3). The cache (111 on FIG. 3) includes cache ways (546) organized in sets (548) where the cache (111 on FIG. 3) is shared among the hardware threads (456 on FIG. 3) of execution.

In the example of FIG. 5, each page of computer memory is restricted for caching by one replacement vector (524) of a class of replacement vectors to particular ways (546) of the cache and each page of memory is also restricted for caching by one or more bits of a replacement vector classification (514) to particular sets (548) of ways of the cache.

The method of FIG. 5 includes translating (506) by an MMU a virtual address (504) of a memory access instruction (502) to a real address (526) through use of a translation lookaside buffer ('TLB') (508) and a page table (510). Examples of such a memory access instruction (502) include a store or load instruction. Translating (506) a virtual address (504) of a memory access instruction (502) to a real address (526) may be carried out by searching the TLB (508) for a memory page for the virtual memory address (504), and if not found in the TLB (508), searching the page table (510) for the memory page for the virtual memory address.

Translating the virtual address (504) to the real address (526) in the example of FIG. 5 may include retrieving page attributes (512) from the page table (510) and TLB (508) for the memory page of the virtual address (504). Such page attributes may be information that describes various attributes of the page of memory, such as a dirty bit that indicates a recent modification of the memory page, a protection bit that indicates whether the page can be read, written, or executed, and a use bit that indicates a recent access of the memory page. Each of the page attributes (512) of a memory page may be implemented as one or more bits. One such page attribute (512) may be a replacement vector classification (514). A replacement vector classification (514) is an attribute of a page of memory that identifies the particular sets of ways of the cache and the particular ways of the cache to which the page in memory is restricted for caching.

The method of FIG. 5 also includes replacing (516) the value of a cache index bit (520) with the value of a bit from the replacement vector classification (516). Consider as an example, a replacement vector classification (506) of 01, a cache index of 10110010, and that the MMU is configured to replace the value of the first, most significant, bit of the cache index with the value of the first bit of the vector replacement classification (516). Replacing (516) the value of the first bit (520) of the cache index with the value of the first bit from the replacement vector classification (516) in this example therefore, results in a cache index of 00110010.

The method of FIG. 5 also includes adding (532) the replaced bit (518) of the cache index (530) to the corresponding tag (528) of the real address (526). Adding (532) the replaced bit (518) of the cache index (530) to the corresponding tag (528) of the real address (526) may be carried out by adding the replaced bit (518) as the last, least significant, bit (518) of the tag. Continuing with the example above, with a tag of 101100, adding the replaced bit of the cache index (530) as the last bit of the tag (528) results in a tag of 1011001. As can be seen, the tag increases in length. Increasing a tag length also increases the associativity of the cache. Increasing the length of the tag by one bit doubles the associativity, increasing the length of tab by two bits quadruples the associativity, and so on as will occur to those of skill in the art.

Adding (532) the replaced bit of the cache index (530) to the corresponding tag (528) of the real address (526) preserves the original value of original value of the cache index in the read address (526). Readers of skill in the art will recognize that upon a cache miss, the MMU may use the preserved original value of the cache index and the original tag to access the real address in main memory. Continuing with the above example, consider that the original tag and index in a single string of bits is 10110010110010 with the first six bits representing the tag and the last six bits representing the index. The modified string after the replacement of the value of the cache index bit and after adding the replaced bit to the tag is 101100100110010. As can been seen from this example, the modified string differs from the original string only in that a bit with value 0 is effectively inserted into the string as the seventh bit. The original value of the string, including the index and tag, is preserved such that, upon a cache miss, the MMU may use that original value preserved in the modified string to access the real address in main memory.

The method of FIG. 5 also includes selecting (534) by a cache controller of an MMU a way for the real address. Selecting a way may include using the replacement vector classification (514) as an index (522) into an array of replacement vectors (524) where each replacement vector identifies authorized particular ways (546), using the index (530) of the modified real address (326) to identify a particular set (548) of ways in which the tag may be stored, and searching the tag values (538) stored in the particular ways in the particular set for the tag (528).

Continuing with the example tag (528), cache index (530), and replacement vector classification (514) described above example, the cache controller may select a way by using the vector classification, 01, as index (522) into an array of replacement vectors (424), identifying the second replacement vector, 11101100. Each bit of value 1 in the example replacement vectors (524) indicates an authorized way and each bit of value 0 in the example replacement vectors indicates a restricted way. For the replacement vector associated with the index 01, ways 0, 1, 2, 3, and 5 are authorized ways and ways 4, 6, and 7 are restricted.

The cache controller then may use the index (530) of the modified real address (326) to identify a particular set (548) of ways in which the tag may be stored. The index (530) of the modified real address (326) is 00110010. Using, only the first two bits of the index (530) for clarity and ease of explanation the cache controller may identify the first set of ways (548) having an index value (544) of 00. The cache controller after identifying the authorized ways and the particular set, may search ways 0, 1, 2, 3, and 5 of the set (548) of ways associated with the index value (544) of 00. As such, the cache controller need only search a maximum of 5 ways for the tag.

If the tag is not found in the particular ways authorized by the replacement vector in the particular set identified by the index (520), a cache miss occurs and the cache controller may use a cache line replacement policy and least recently used ('LRU') information (538) of the particular ways authorized by the replacement vector in the particular set of ways identified by the index (530) to select a way identifier ('ID') (536) for eviction. The LRU information may be derived from LRU bits (550) in a cache directory that indicate whether a cache line was recently accessed.

If the tag is found in the particular ways authorized by the replacement vector in the particular set identified by the index (520), a cache hit occurs and the cache controller selects the way ID (536) of the particular way in which the tag is stored for use in caching the data of the memory access instruction (502).

Exemplary embodiments of the present invention are described largely in the context of a fully functional computer system for data processing with a NOC. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A network on chip ('NOC') comprising:
   integrated processor ('IP') blocks, routers, memory communications controllers, and network interface controllers, each IP block adapted to a router through a memory communications controller and a network interface controller, each memory communications controller controlling communications between an IP block and memory, each network interface controller controlling inter-IP block communications through routers;
   a multiplicity of computer processors within the IP blocks, each computer processor implementing a plurality of hardware threads of execution; and
   computer memory, the computer memory organized in pages and operatively coupled to one or more of the computer processors, the computer memory including a set associative cache, the cache comprising cache ways organized in sets, the cache being shared among the hardware threads of execution, each page of computer memory restricted for caching by one replacement vector of a class of replacement vectors to particular ways of the cache, each page of memory further restricted for caching by one or more bits of a replacement vector classification to particular sets of ways of the cache, each page of memory further restricted for caching by one or more bits of a replacement vector classification replacing bits in a cache index for a cache line of a memory page, the replaced bits added to a corresponding cache line tag to preserve the original address of the cache line.

2. The NOC of claim 1 wherein:
   each replacement vector limits a cache line replacement policy in replacing cache lines from a particular page of memory to particular ways of the cache.

3. The NOC of claim 1 wherein each page of memory further restricted for caching by one or more bits of a replacement vector classification to particular sets of ways of the cache further comprises:
   each page of memory further restricted for caching by one or more bits of a replacement vector classification replacing bits in a cache index for a cache line of a memory page.

4. The NOC of claim 1 wherein the memory communications controller comprises:
   a plurality of memory communications execution engines, each memory communications execution engine enabled to execute a complete memory communications instruction separately and in parallel with other memory communications execution engines; and
   bidirectional memory communications instruction flow between the network and the IP block.

5. The NOC of claim 1 wherein each IP block comprises a reusable unit of synchronous or asynchronous logic design used as a building block for data processing within the NOC.

6. The NOC of claim 1 wherein each router comprises two or more virtual communications channels, each virtual communications channel characterized by a communication type.

7. The NOC of claim 1 wherein each network interface controller is enabled to:
convert communications instructions from command format to network packet format; and
implement virtual channels on the network, characterizing network packets by type.

8. The NOC of claim 1 wherein each IP block is enabled to bypass the IP block's memory communications controller and send inter-IP block, network-addressed communications directly to the network through IP block's network interface controller.

9. The NOC of claim 1 wherein each IP block is enabled to send memory-address-based communications to and from memory through the IP block's memory communications controller and then also through the IP block's network interface controller to the network.

10. A method of data processing with a network on chip ('NOC'), the NOC comprising:
integrated processor ('IP') blocks, routers, memory communications controllers, and network interface controllers, each IP block adapted to a router through a memory communications controller and a network interface controller;
a multiplicity of computer processors within the IP blocks, each computer processor implementing a plurality of hardware threads of execution; and
computer memory, the computer memory organized in pages and operatively coupled to one or more of the computer processors, the computer memory including a set associative cache, the cache comprising cache ways organized in sets, the cache being shared among the hardware threads of execution;
the method comprising:
controlling by each memory communications controller communications between an IP block and memory,
restricting each page of computer memory for caching by one replacement vector of a class of replacement vectors to particular ways of the cache;
restricting each page of memory for caching by one or more bits of a replacement vector classification to particular sets of ways of the cache wherein restricting each page of memory for caching by one or more bits of a replacement vector classification to particular sets of ways of the cache further comprises:
replacing, with one or more bits of a replacement vector classification one or more bits in a cache index for a cache line of a memory page; and
preserving an original value of the cache index for the cache line by adding the one or more replaced bits to a corresponding cache line tag; and
controlling by each network interface controller inter-IP block communications through routers.

11. The method of claim 10 wherein restricting each page of computer memory for caching by one replacement vector of a class of replacement vectors to particular ways of the cache further comprises limiting by each replacement vector a cache line replacement policy in replacing cache lines from a particular page of memory to particular ways of the cache.

12. The method of claim 10 wherein restricting each page of memory for caching by one or more bits of a replacement vector classification to particular sets of ways of the cache further comprises replacing, with one or more bits of a replacement vector classification, one or more bits in a cache index for a cache line of a memory page.

13. The method of claim 10 wherein the memory communications controller comprises a plurality of memory communications execution engines and controlling communications between an IP block and memory further comprises:
executing by each memory communications execution engine a complete memory communications instruction separately and in parallel with other memory communications execution engines; and
executing a bidirectional flow of memory communications instructions between the network and the IP block.

14. The method of claim 10 wherein each IP block comprises a reusable unit of synchronous or asynchronous logic design used as a building block for data processing within the NOC.

15. The method of claim 10 further comprising transmitting messages by each router through two or more virtual communications channels, each virtual communications channel characterized by a communication type.

16. The method of claim 10 wherein controlling inter-IP block communications further comprises:
converting by each network interface controller communications instructions from command format to network packet format; and
implementing by each network interface controller virtual channels on the network, characterizing network packets by type.

17. The method of claim 10 further comprising sending by each IP block memory-address-based communications to and from memory through the IP block's memory communications controller and through the IP block's network interface controller to the network.

18. The method of claim 10 further comprising:
bypassing, by each IP block, the IP block's memory communications controller; and
sending, by each IP block, inter-IP block, network addressed communications directly to the network through the IP block's network interface controller.

* * * * *